United States Patent

Sato

[15] 3,648,053
[45] Mar. 7, 1972

[54] WARNING CIRCUIT FOR USE IN A TTL-TYPE ELECTRONIC SHUTTER

[72] Inventor: Takayoshi Sato, Tokyo, Japan
[73] Assignee: Kabushikikaisha Copal, Tokyo, Japan
[22] Filed: Nov. 6, 1970
[21] Appl. No.: 87,411

[30] Foreign Application Priority Data

Nov. 14, 1969 Japan...................................44/91710
Nov. 22, 1969 Japan..................................44/111135

[52] U.S. Cl..........................250/214 P, 95/10 CT, 250/215, 340/221
[51] Int. Cl........................G01j 1/00, G01j 1/52, H01i 39/12
[58] Field of Search......................250/214 P, 215; 95/10 CT; 340/221

[56] References Cited

UNITED STATES PATENTS 3,592,113  7/1971  Von Wasielewski...............250/215 X Primary Examiner—James W. Lawrence
Assistant Examiner—T. N. Grigsby
Attorney—Kelman and Berman

[57] ABSTRACT

Warning circuit for use in a TTL-type electronic shutter having an integrating circuit, a memory circuit, an exposure control circuit and a switching circuit for actuating shutter blades for the proper exposure in accordance with the intensity of light received by a photoelectric element of the integrating circuit adapted to receive the light from the object through the objective of a camera. The memory circuit provides a reference voltage in accordance with the reference time set in the integrating circuit in response to the intensity of light. The warning circuit comprises a series circuit of a resistor and a capacitor and a transistor connected to the series circuit and adapted to energize pilot means when triggered. The series circuit is connected to the memory circuit so as to be actuated during the reference time while the transistor is triggered when the voltage of the capacitor reaches the triggering voltage of the transistor. The emitter bias of the transistor is set to either of the upper limit or the lower limit of the shutter speed, so that the improper condition of the scene brightness for the proper exposure is detected by inspecting whether or not the pilot means is energized.

10 Claims, 4 Drawing Figures

Patented March 7, 1972

INVENTOR
Takayoshi Sato
BY Kelman and Berman
Agents

INVENTOR
Takayoshi Sato
BY Kelman and Berman
agents

WARNING CIRCUIT FOR USE IN A TTL-TYPE ELECTRONIC SHUTTER

CROSS-REFERENCE TO RELATED APPLICATION

Reference is made to U.S. Pat. application Ser. No. 63,214 filed Aug. 12, 1970 entitled "METHOD FOR AUTOMATICALLY DETERMINING THE EXPOSURE TIME OF AN ELECTRONIC SHUTTER OF A TTL TYPE PHOTOGRAPHIC CAMERA AND THE ELECTRONIC SHUTTER FOR CARRYING OUT THE METHOD" filed by the same applicant as that of this application in which the priority based on Japanese Pat. applications Nos. 65423/1969, 78775/1969 and 85228/1969 filed respectively on Aug. 18, 1969, Oct. 2, 1969 and Oct. 27, 1969 is claimed.

BACKGROUND OF THE INVENTION

The present invention relates to a warning circuit for use in a TTL-type electronic shutter and, more particularly, to a warning circuit incorporated in a TTL-type electronic shutter for warning of the inappropriate condition of the intensity of light for the proper exposure and detecting the voltage of the electric source for insuring the exact operation of the electronic shutter.

The present invention is particularly useful when used with the electronic shutter disclosed in the U.S. Pat. application Ser. No. 63,214 filed Aug. 12, 1970 described above, although the present invention is advantageously used with a conventional TTL-type electronic shutter.

The electronic shutter of the type described above operates as follows. During the first part of the operation of a release means of the camera, the light from the object is received through the objective lens of the camera by a photoelectric element such as a photoconductive element or a photovoltaic element in an integrating circuit having transistors and a capacitor connected in series to the photoelectric element so that a reference time is set in the integrating circuit in accordance with the intensity of light received by the photoelectric element and the time constant as set by the capacitor and the photoelectric element, during which reference time a second photoelectric element in the camera receives the light from the object directly without passing through the objective lens so that a memory circuit connected to the integrating circuit and having the above second photoelectric element, a transistor and a second capacitor connected in series to the second photoelectric element is actuated so as to electrically charge or discharge (after preliminarily charged) the second capacitor through the above second photoelectric element thereby permitting a reference voltage to be set in the memory circuit in accordance with the above reference time and the intensity of light received by the second photoelectric element. As the operation of release means proceeds the shutter blade is opened, while an exposure control circuit connected to the memory circuit and having a third photoelectric element, a transistor and a third capacitor connected in series to the third photoelectric element is actuated so as to electrically charge or discharge (after preliminarily charged) the third capacitor through the third photoelectric element which receives the light from the object directly without passing through the objective lens. The voltage appearing in the third capacitor during the actuation of the exposure control circuit is compared with the above reference voltage set in the memory circuit by using the transistor so as to actuate a switching circuit connected to the exposure control circuit when the voltage of the third capacitor reaches a predetermined value with respect to the above reference voltage thereby closing the shutter blade to obtain the proper exposure time regardless of the variation in the intensity of the light after the shutter blade is opened for the exposure.

The second photoelectric element may be used commonly as the third photoelectric element by switching the connections thereof from the memory circuit to the exposure control circuit.

When the variation in the intensity of light from the object during the exposure may be ignored, the second and the third photoelectric element may be replaced by fixed resistors or variable resistors, respectively.

As described above, an electronic shutter automatically regulates the exposure time to achieve the proper exposure in response to the various condition of the scene brightness. However, there is a certain limitation in the maximum shutter speed of an electronic shutter due to the time lag in the movement of mechanical elements in the shutter even though the scene brightness requires a shutter speed higher than the maximum shutter speed. In general, the maximum shutter speed of an electronic shutter is said to be about 1/1,000 sec. due to the time lag in the operation of a shutter blade closing mechanism of the shutter. Thus, an overexposure will result in the electronic shutter when the scene brightness is too high for the exposure of 1/1,000 sec. On the other hand, swaying or vibration of a camera will necessarily take place when the camera is held by the operator so that a high-quality photograph can not be obtained due to the swaying of the camera when the scene brightness is too low requiring an exposure time longer than about 1/30 sec.

Therefore, it is desirable to incorporate in an electronic shutter a warning circuit which indicates whether or not the exposure time automatically set by the electronic shutter exceeds the above mentioned limits of the exposure time.

An electronic shutter is provided with an electric source for actuating the shutter blade operating mechanism and other mechanism of the shutter. The voltage of the electric source must be kept at an appropriate value in order to insure the proper operation of the shutter. Since the voltage of the electric source decreases as it is used, it is desirable to provide a detecting circuit in the electronic shutter for detecting whether or not the voltage of the electric source is appropriate for the proper operation of the shutter.

SUMMARY OF THE INVENTION

An object of the present invention is to provide a warning circuit of a TTL-type electronic shutter which issues a warning signal when the exposure time set by the electronic shutter exceeds the limits for obtaining a proper exposure.

Another object of the present invention is to provide a detecting circuit of a TTL-type electronic shutter which detects the inappropriate voltage of the electric source of the shutter so that the improper operation of the shutter is prevented.

The above objects are achieved in accordance with the present invention by the provision of a warning circuit consisting of a series circuit of a resistor, a capacitor with the resistor connected to the transistor of the memory circuit and with the capacitor connected to one terminal of the electric source, a first transistor with its base connected to the junction of the resistor and the capacitor and with its emitter supplied with an emitter bias by the electric source, a second transistor with its base connected to the collector of the first transistor, and a pilot means such as a lamp with its one terminal connected to the collector of the second transistor while the other terminal of the pilot means is connected to the one terminal of the electric source, the emitter of the second transistor being connected to the other terminal of the electric source, the time constant as set by the series circuit and the emitter bias of the first transistor for rendering the first transistor to be conductive being determined so as to correspond to one of the upper limit and the lower limit of the shutter speed. By this arrangement, when the time constant is set so as to correspond to the upper limit of the shutter speed, the pilot means is kept deenergized when the scene brightness is too high so that the exposure time to be set by the electronic shutter is made higher than the upper limit of the shutter speed, thereby indicating that the scene brightness is inappropriate for the proper exposure. On the other hand, when the time constant is set so as to correspond to the lower limit of the shutter speed beyond which the blurring of the photograph might occur, the pilot means is energized when the scene brightness is too low so that the exposure time set by the electronic shutter exceeds the lower limit of the shutter speed thereby indicating that the scene brightness is inappropriate for obtaining a high-quality photograph without blurring.

In accordance with the present invention, a pair of warning circuits may be incorporated in the electronic shutter, one being for the upper limit of the shutter speed while the other is for the lower limit of the shutter speed.

In accordance with a further feature of the present invention, the warning circuit may comprise a series circuit of a pair of diodes connected in series and a resistor with the junction of the diodes and the resistor being connected to the base of the first transistor and with the resistor connected to the one terminal of the electric source while the pair of diodes are connected to the other terminal of the electric source so as to apply a base bias to the first transistor by means of the series circuit of the diodes and the resistor, and a switch connected in series in the series circuit of the diodes and the resistor. By this arrangement, the pilot means is energized by the closure of the switch when the voltage of the electric source is equal to or higher than a predetermined value for properly operating the electronic shutter by appropriately setting the emitter bias of the first transistor. Thus, the voltage of the electric source can easily be investigated by the warning circuit of the present invention.

DETAILED DESCRIPTION OF THE PREFERRED EMBODIMENTS

Figure 1:
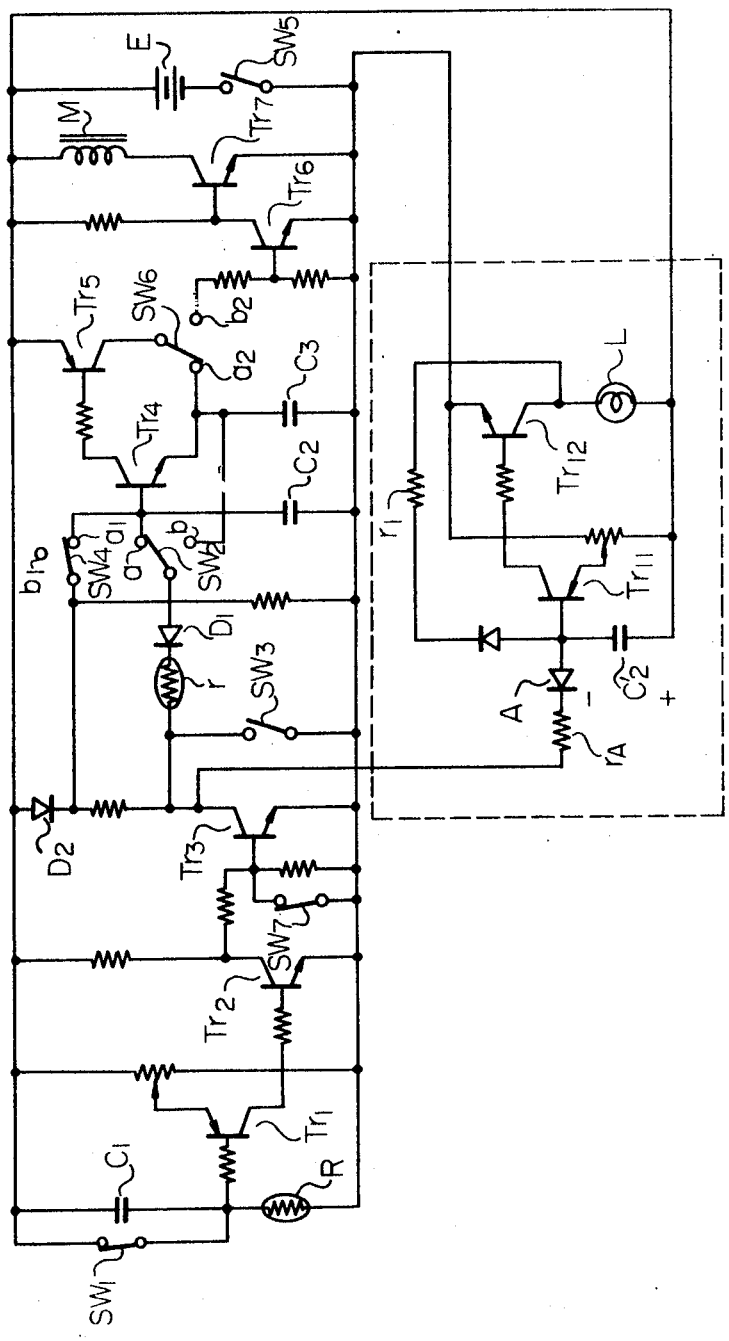
FIG. 1 is a diagram showing an embodiment of the warning circuit of the present invention.

Referring to FIG. 1 showing the general arrangement of the electric circuit of the present invention, the electronic shutter comprises an integrating circuit consisting of a photoelectric element R receiving the light from the object through the objective of the camera, a capacitor $C_1$ connected in series to the photoelectric element R and transistors $Tr_1$, $Tr_2$, a memory circuit consisting of a photoelectric element r receiving the light from the object directly without passing through the objective, a capacitor $C_2$ selectively connectable in series to the photoelectric element r through switch $SW_2$ and a transistor $Tr_3$ with its base connected to the collector of the transistor $Tr_2$, an exposure control circuit consisting of a capacitor $C_3$ selectively connectable to the photoelectric element r by switching the switch $SW_2$ to contact b and a transistor $Tr_4$ with its base connected to the capacitor $C_2$, a switching circuit consisting of transistors $Tr_5$, $Tr_6$ and $Tr_7$ and electromagnet M for actuating shutter blade arresting means for keeping the shutter blade opened during the energization of the electromagnet M, and an electric source E for energizing the circuit, switches $SW_1$ to $SW_7$ being provided for the sequential operation of the circuit, the switches being shown in positions prior to the operation of the shutter.

At the first part of the operation of the release means of the camera, the capacitors $C_2$, $C_3$ are changed to a predetermined voltage preliminarily to the operation of the shutter. Then, switches $SW_1$, $SW_2$ are opened in coupled relationship with each other so as to render the transistor $Tr_3$ to be conductive to discharge the capacitor $C_2$ while the capacitor $C_1$ is charged through the photoelectric element R. When the voltage of the capacitor $C_1$ reaches the value to render the transistor $Tr_1$ to be conductive, i.e., after the lapse of the reference time set in the integrating circuit, the transistor $Tr_2$ is made conductive to render the transistor $Tr_3$ to be nonconductive to terminate the discharging of the capacitor $C_2$ so that a reference voltage indicative of the intensity of light from the object is kept in the capacitor $C_2$, the reference voltage being applied to the base of the transistor $Tr_4$. When the leading shutter blade is opened by the succeeding part of the operation of the release means while the succeeding shutter blade is arrested for the exposure by the actuation of the electromagnet M, the switch $SW_2$ is switched to contact b and the switch $SW_3$ is closed so as to commence the discharging of the capacitor $C_3$. When the voltage of the capacitor $C_3$ applied to the emitter of the transistor $Tr_4$ reaches the triggering voltage of the transistor $Tr_4$ to the base of which the reference voltage is applied, the transistor $Tr_4$ is rendered to be conductive so as to make the transistors $Tr_5$, $Tr_6$ conductive so that the transistor $Tr_7$ is rendered to be nonconductive to deenergize the electromagnet thereby freeing the shutter blade arresting means to permit the succeeding shutter blade to be closed to terminate the exposure to achieve the proper exposure.

In this case, the exposure time T has the following relationship to the reference time $T_1$ set in the integrating circuit:

$$T = T_1(C_3/C_2)$$

where $C_2$, $C_3$ designate the capacity of each of the capacitors $C_2$, $C_3$.

In accordance with the present invention, a warning circuit is provided.

The warning circuit comprises a resistor $r_A$, a capacitor $C_2'$ connected in series to the resistor $r_A$, a transistor $Tr_{11}$ with its base connected to the junction of the resistor $r_A$ and the capacitor $C_2'$, a transistor $Tr_{12}$ with its base connected to the collector of the transistor $Tr_{11}$ and a lamp L connected to the collector of the transistor $Tr_{12}$. The end of the resistor $r_A$ opposite to the junction of the resistor $r_A$ and the capacitor $C_2'$ is connected to the collector of the transistor $Tr_3$ of the memory circuit of the electronic shutter and one terminal of the electric source E is connected to the terminal of the capacitor $C_2'$ opposite to the junction with the resistor $r_A$ and the terminal of the lamp L opposite to that connected to the collector of the transistor $Tr_{12}$ while the other terminal of the electric source E is connected through the switch $SW_5$ to the emitter of the transistor $Tr_{12}$ and the terminal of the capacitor $C_2'$ opposite to that connected to the resistor $r_A$ through a resistor with which a brush connected to the emitter of the transistor $Tr_{11}$ slidably contacts so that the emitter bias applied to the transistor $Tr_{11}$ can be adjusted. The base of the transistor $Tr_{11}$ is connected to the collector of the transistor $Tr_{12}$ through a resistor $r_1$. A diode is connected between the resistor $r_A$ and the capacitor $C_2'$ while another diode is connected between the capacitor $C_2'$ and the resistor $r_1$.

By this arrangement, the capacitor $C_2'$ is charged through the resistor $r_A$ during the time the transistor $Tr_3$ is made conductive, i.e., during the reference time $T_1$. The voltage of the capacitor $C_2'$ is a function of the exposure time $T$, because the exposure time $T$ is a function of the reference time $T_1$ as described previously.

In operation, when the release means is actuated under the condition shown in FIG. 1 so that the switch $SW_5$ is closed, the capacitors $C_2$, $C_3$ are charged through switches $SW_4$, $SW_6$ to the voltage of the electric source E. Then, the switch $SW_4$ is switched to contact $B_1$ while the switch $SW_6$ is switched to contact $b_2$. The switches $SW_1$, $SW_7$ are opened for the commencement of the measurement of the intensity of the light to obtain the reference voltage in the capacitor $C_2$ by discharging it during the reference time set by the integrating circuit, i.e., during the time the transistor $Tr_3$ is conductive. At the same time, the warning circuit is actuated during the reference time, i.e., during the time the transistor $Tr_3$ is conductive so that the capacitor $C_2'$ is charged through the resistor $r_A$. When the voltage of the capacitor $C_2'$ appearing at A reaches the emitter bias of the transistor $Tr_{11}$, it is rendered to be conductive so that the transistor $Tr_{12}$ is also rendered to be conductive to energize the lamp L. In case the overexposure at the highest shutter speed of 1/1000 sec. is to be prevented, the time constant within which the transistor $Tr_{11}$ is made conductive as set by the resistance of the resistor $r_A$, the capacity of the capacitor $C_2'$, and the emitter bias of the transistor $Tr_{11}$ is adjusted so as to correspond to 1/1,000 sec., i.e., the upper limit of the shutter speed with respect to the reference time set by the integrating circuit.

If the lamp L is not energized, it means that the voltage of the capacitor $C_2'$ does not reach the triggering voltage of the transistor $Tr_{11}$ within the reference time set by the integrating circuit. In other words, the transistor $Tr_3$ is rendered to be nonconductive prior to the lapse of the time constant set in the warning circuit so as to correspond to the shutter speed of 1/1,000 sec., thereby indicating that the exposure time to be set by the electronic shutter for the proper exposure is shorter than 1/1000 sec. Therefore, the operator is informed that the intensity of light is inappropriate for the proper exposure at the shutter speed of 1/1,000 sec. when the lamp L is not energized.

To the contrary, if the time constant is set so as to correspond to 1/30 sec. beyond which the swaying of the camera might occur to result in blurring of the picture and the lamp L is energized, it means that the exposure time to be set by the electronic shutter for the proper exposure is longer than the shutter speed of 1/30 sec., thereby indicating the insufficient intensity of light in order to obtain a high-quality picture. The energization of the lamp L is maintained by virtue of the positive feedback connection of the resistor $r_1$ even through the signal from the transistor $Tr_3$ disappears.

Figure 2:
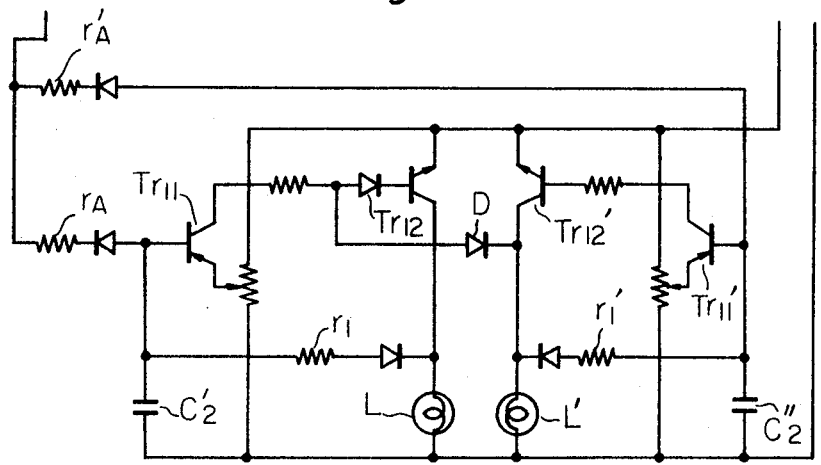
FIG. 2 shows a modification of FIG. 1.

FIG. 2 shows a modification of the warning circuit of FIG. 1 in which two kinds of the time constants are set for warning the inappropriate conditions of the intensity of light beyond either of the upper limit and the lower limit. To this end, a resistor $r_A'$, a resistor $r_1'$, a capacitor $C_2''$, transistor $Tr_{11}'$, $Tr_{12}'$ and a lamp L' are added to the warning circuit which are connected in like manner as the resistor $r_A$, the resistor $r_1$, the capacitor $C_2'$, transistors $Tr_{11}$, $Tr_{12}$ and the lamp L. A diode D is connected to the base of the transistor $Tr_{12}$ and the collector of the transistor $Tr_{12}'$. The time constant for the transistor $Tr_{11}$ is made to correspond to the shutter speed of 1/1,000 sec., while the time constant for the transistor $Tr_{11}'$ is made to correspond to 1/30 sec.

Then, when the exposure time to be set by the electronic shutter exceeds the upper limit, 1/1,000 sec., the transistors $Tr_{11}$, $Tr_{11}'$ are kept nonconductive so that the lamps L, L' are kept deenergized thereby indicating that the intensity of light is too great to obtain the proper exposure at the shutter speed of 1/1,000 sec. If the exposure time is within the range of the upper limit, 1/1000 sec. and the lower limit, 1/30 sec., the transistor $Tr_{11}$ is made conductive to energize the lamp L while the transistor $Tr_{11}'$ is kept nonconductive to keep the lamp L' deenergized, thereby indicating that the intensity of light is appropriate to obtain the proper exposure time by the electronic shutter. If the exposure time to be set by the electronic shutter exceeds beyond the lower limit, 1/30 sec., both the transistors $Tr_{11}$ and $Tr_{11}'$ are made conductive to energize the lamp L' through the transistor $Tr_{12}'$ while the transistor $Tr_{12}$ is made nonconductive by means of the diode D connected between the collector of the transistor $Tr_{12}'$ and the base of the transistor $Tr_{12}$ so as to decrease the base voltage of the transistor $Tr_{12}$, so that the lamp L is deenergized thereby indicating that the indicating the intensity of light is inappropriate for obtaining a high-quality picture without blurring. The inspection of the lamps L, L' will be facilitated if the color of the lamp L is made different from that the of the lamp L'.

The energization of each of the lamps L, L' is maintained even though the signal from the transistor $Tr_3$ disappears by virtue of the positive feedback connection of the resistors $r_1$, $r_1'$.

Figure 3:
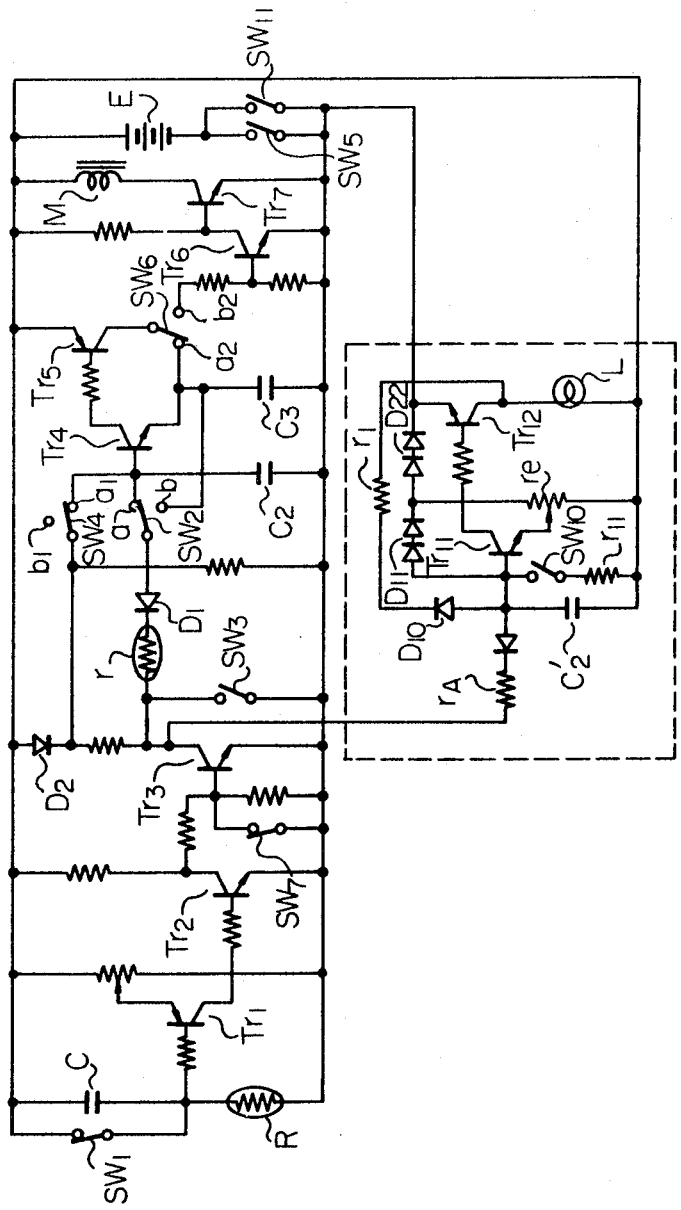
FIG. 3 is a diagram showing a second embodiment of the warning circuit of the present invention by which the voltage of the electric source can be investigated.

FIG. 3 shows a further modification of the circuit of FIG. 1 in which the voltage of the electric source E is investigated in a simple manner. The circuit of FIG. 3 is substantially similar to that of FIG. 1 except that switches $SW_{10}$, $SW_{11}$ and a resistor $r_{11}$ are added as shown and two sets of varister diodes $D_{11}$, $D_{12}$ are connected in the warning circuit.

In order to investigate the voltage of the electric source E. The switch $Sw_{11}$ is closed to apply to the warning circuit the voltage of the electric source E. Then, the switch $SW_{10}$ is closed. The emitter voltage $V_e$ of the transistor $Tr_{11}$ is expressed as follows:

$$V_e = V_{D22} + (V - V_{D22})/n$$

where:
$V_{D22}$=the voltage in the forward direction of the varister diode $D_{22}$
$V$=the voltage of the electric source E
$n$=the dividing ratio of the voltage dividing resistor $r_e$ The base of the transistor $Tr_{11}$ is supplied with a voltage equal to the voltage $V$ of the electric source E divided by the diode $D_{11}$ and the resistor $r_{11}$. Since the voltage $V_{D11}$ in the forward direction of the diode $D_{11}$ is constant regardless of the value of the voltage $V$ of the electric source E, the base voltage $V_e$ of the transistor $Tr_{11}$ is kept constant while, on the other hand, the emitter voltage $Ve$ varies depending upon the voltage $V$ of the electric source E as described above.

Therefore, by setting the voltage dividing ratio of the resistor $r_e$ appropriately so that the emitter voltage $V_e$ of the transistor $Tr_{11}$ is made higher than the base voltage of the transistor $Tr_{11}$ when the voltage $V$ of the electric source E is higher than the predetermined value for properly operating the electronic shutter, the transistor $Tr_{11}$ is made conductive so as to render the transistor $Tr_{12}$ to be conductive. The conductive condition of the transistor $Tr_{12}$ is further insured by the positive feedback connection of the diode $D_{10}$. Thus, the lamp L is energized to indicate that the voltage of the electric source E is appropriate for the proper operation of the electronic shutter. To the contrary, when the voltage of the electric source E is lower than the predetermined value, the transistor $Tr_{11}$ is made nonconductive to deenergize the lamp L to indicate that the voltage of the electric source is insufficient for the proper operation of the electronic shutter.

Figure 4:
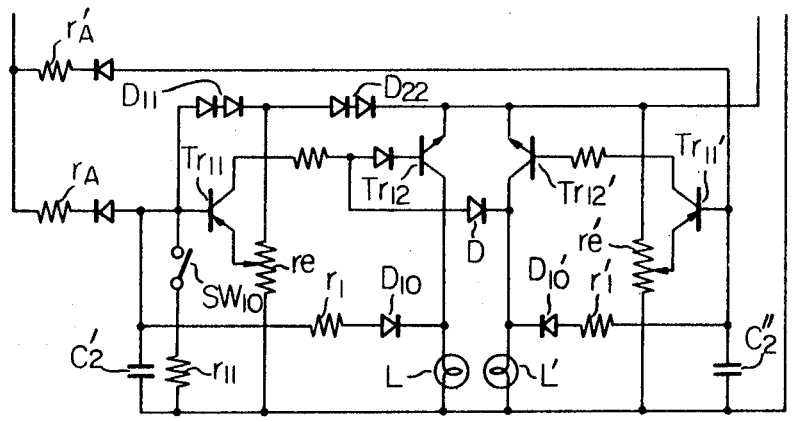
FIG. 4 shows a modification of FIG. 2, by which the voltage of the electric source can be investigated.

FIG. 4 shows a modification of FIG. 3 in which the warning is issued when the intensity of light exceeds beyond either of the upper and lower limits as in the case of the circuits of FIG. 2.

As described above, the diode $D_{11}$ is indispensable to keep the base voltage of the transistor $Tr_{11}$ constant so as to permit the checking of the voltage of the electric source, however, the varister diode $D_{22}$ may be dispensed with.

In the above description, the capacitors $C_2$, $C_3$ of the electronic shutter are described as being preliminarily charged proper to the measurement of the intensity of light. However, the present invention can be used in an electronic shutter in which the capacitors are charged for the memorization of the intensity of light and for the exposure control.

I claim:

1. Warning circuit for use in a TTL-type electronic shutter for warning the inappropriate condition of the scene brightness for the proper exposure, said electronic shutter consisting of an electric source, an integrating circuit having a photoelectric element receiving the light from the object through the objective of a camera, a first capacitor connected in series to said photoelectric element and a transistor with its base connected to the junction of said photoelectric element and said first capacitor, and supplied with the emitter bias by said electric source, a memory circuit having an electrical resistance element such as a photoelectric element and a resistor, a second capacitor connected in series to said electrical resistance element and a transistor with its base connected to said integrating circuit, and an automatic exposure control circuit, said first capacitor being charged through said photoelectric element until said transistor in said integrating circuit is made conductive, the time during which said capacitor is charged being a reference time set in accordance with the intensity of light from the object, said second capacitor being charged or discharged during said reference time through said electrical resistance element until said transistor in memory circuit is rendered to be nonconductive by the switching of said transistor in said integrating circuit so as to provide a reference voltage in said second capacitor indicative of the intensity of the light, said reference voltage being utilized in obtaining the proper exposure by said exposure control circuit, wherein the improvement comprises a series circuit of a resistor and a capacitor with said resistor connected to said transistor of said memory circuit and with said capacitor connected to one terminal of said electric source, a first transistor with its base connected to the junction of said resistor and said capacitor and with its emitter supplied with an emitter bias by said electric source, a second transistor with its base connected to the collector of said first transistor, and pilot means such as a lamp with it one terminal connected to the collector of said second transistor while the other terminal of said pilot means is connected to said one terminal of said electric source, the emitter of said second transistor being connected to the other terminal of said electric source, the time constant as set by said series circuit and the emitter bias of said first transistor for rendering said first transistor to be conductive being determined so as to correspond to one of the upper limit of the shutter speed and the lower limit of the shutter speed beyond which blurring of the photograph might occur, thereby permitting the inappropriate condition of the scene brightness for the proper exposure to be determined by the energization or the deenergization of said pilot means.

2. Warning circuit according to claim 1, further comprising a resistor with one end connected to the junction of the collector of said second transistor and said pilot means to form a positive feedback connection for maintaining the actuated state of said pilot means even though said transistor in said memory circuit is switched.

3. Warning circuit according to claim 1, further comprising a second series circuit of a resistor and a capacitor with said resistor connected to said transistor of said memory circuit and with said capacitor connected to said one terminal of said electric source, a third transistor with its base connected to the junction of said resistor and said capacitor in said second series circuit and with its emitter supplied with an emitter bias by said electric source, a fourth transistor with its base connected to the collector of said third transistor, and second pilot means such as a lamp with its one terminal connected to the collector of said fourth transistor while the other terminal of said pilot means is connected to said one terminal of said electric source, the emitter of said fourth transistor being connected to said other terminal of said electric source, the time constant as set by said first mentioned series circuit and the emitter bias of said first transistor for rendering said first transistor to be conductive being determined so as to correspond to the upper limit of the shutter speed while the time constant as set by said second series circuit with and the emitter bias of said third transistor for rendering said third transistor to be conductive is determined so as to correspond to the lower limit of the shutter speed.

4. Warning circuit according to claim 3, further comprising a resistor with one end connected to the junction of the collector of said second transistor and said first mentioned pilot means to form a positive feedback connection for maintaining the actuated state of said first mentioned pilot means even though said transistor in said memory circuit is switched, and another resistor with one end connected to the junction of the collector of said fourth transistor and said second pilot means to form a positive feedback connection for maintaining the actuated state of said second pilot means even though said transistor in said memory circuit is switched.

5. Warning circuit according to claim 4, further comprising a diode connected between the base of said second transistor and the collector of said fourth transistor so that said second transistor is rendered to be nonconductive to deenergize said first mentioned pilot means when said third transistor is rendered to be conductive to energize said second pilot means through said fourth transistor.

6. Warning circuit according to claim 1, further comprising a series circuit of a pair of diodes connected in series and a resistor with the junction of said diodes and said resistor being connected to the base of said first transistor and with said resistor connected to said one terminal of said electric source while said pair of diodes are connected to said other terminal of said electric source so as to apply a base bias to said first transistor by means of said series circuit of said diodes and said resistor, and a switch connected in said series circuit of said diodes and said resistor, thereby permitting said pilot means to be energized by the closure of said switch when the voltage of said electric source is equal to or higher than a predetermined value for properly operating the electronic shutter by appropriately setting the emitter bias of said first transistor.

7. Warning circuit according to claim 6, further comprising a resistor connected between the base of said first transistor and the collector of said second transistor to form a positive feedback connection for maintaining the actuated condition of said pilot means even after said transistor in said memory circuit is switched.

8. Warning circuit according to claim 3, further comprising a series circuit of a pair of diodes connected in series and a resistor with the junction of said diodes and said resistor being connected to the base of said first transistor and with said resistor connected to said one terminal of said electric source while said pair of diodes are connected to said other terminal of said electric source so as to apply a base bias of said first transistor by means of said series circuit of said diodes and said resistor, and a switch connected in said series circuit of said diodes and said resistor, thereby permitting said pilot means to be energized by the closure of said switch when the voltage of said electric source is equal to or higher than a predetermined value for properly operating the electronic shutter by appropriately setting the emitter bias of said first transistor.

9. Warning circuit according to claim 8, further comprising a resistor with one end connected to the junction of the collector of said second transistor and said first mentioned pilot means to form a positive feedback connection for maintaining the actuated state of said first mentioned pilot means even though said transistor in said memory circuit is switched, and another resistor with one end connected to said junction of the collector of said fourth transistor and said second pilot means to form a positive feedback connection for maintaining the actuated state of said second pilot means even though said transistor in said memory circuit is switched.

10. Warning circuit according to claim 9, further comprising a diode connected between the base of said second transistor and the collector of said fourth transistor so that said second transistor is rendered to be nonconductive to deenergize said first mentioned pilot means when said third transistor is rendered to be conductive to energize said second pilot means through said fourth transistor.

* * * * *